No. 728,460. PATENTED MAY 19, 1903.
S. B. HART.
CROSS CONVEYER FOR SEPARATORS, &c.
APPLICATION FILED JAN. 7, 1903.
NO MODEL. 5 SHEETS—SHEET 1.
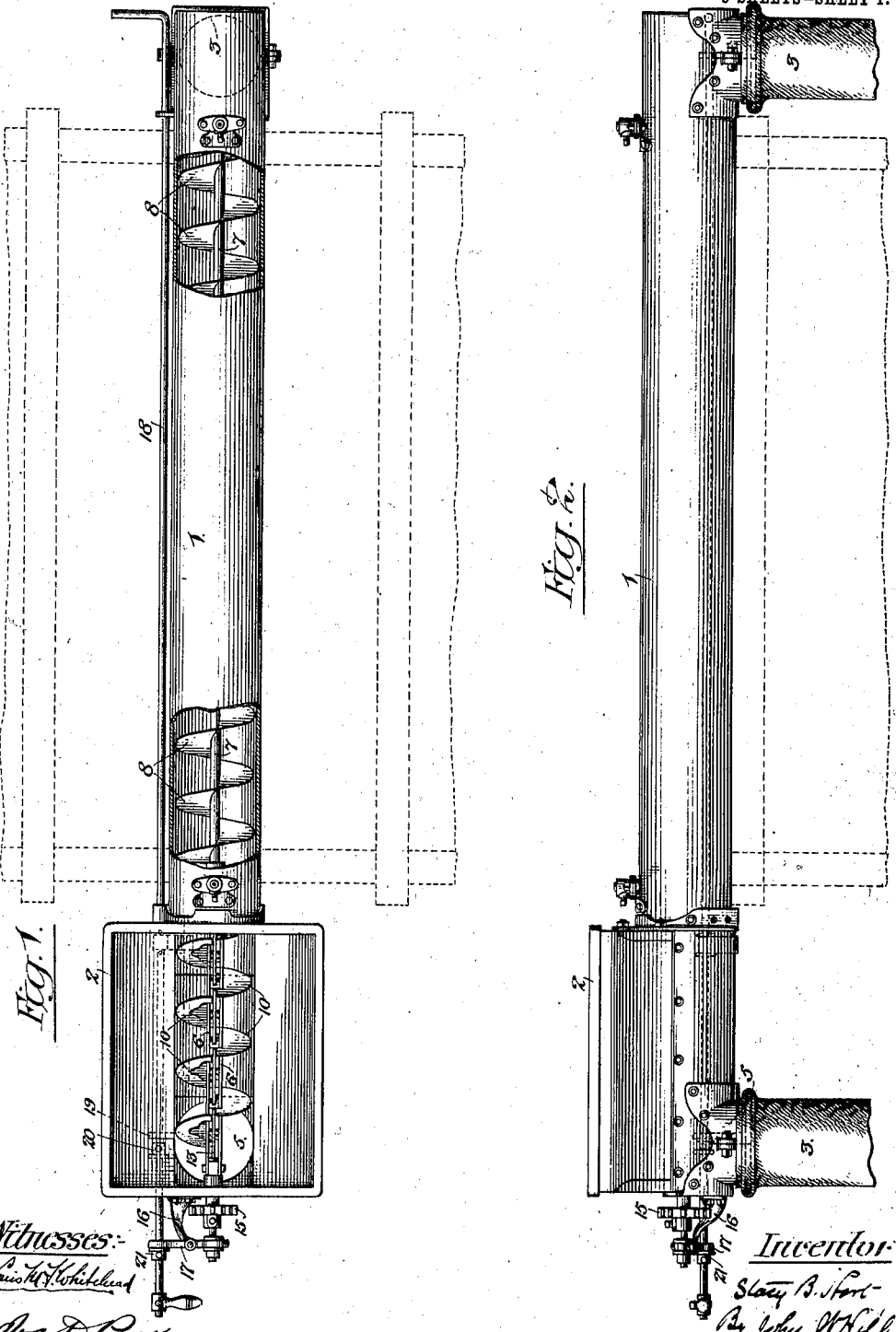

No. 728,460. PATENTED MAY 19, 1903.
S. B. HART.
CROSS CONVEYER FOR SEPARATORS, &c.
APPLICATION FILED JAN. 7, 1903.
NO MODEL. 5 SHEETS—SHEET 2.

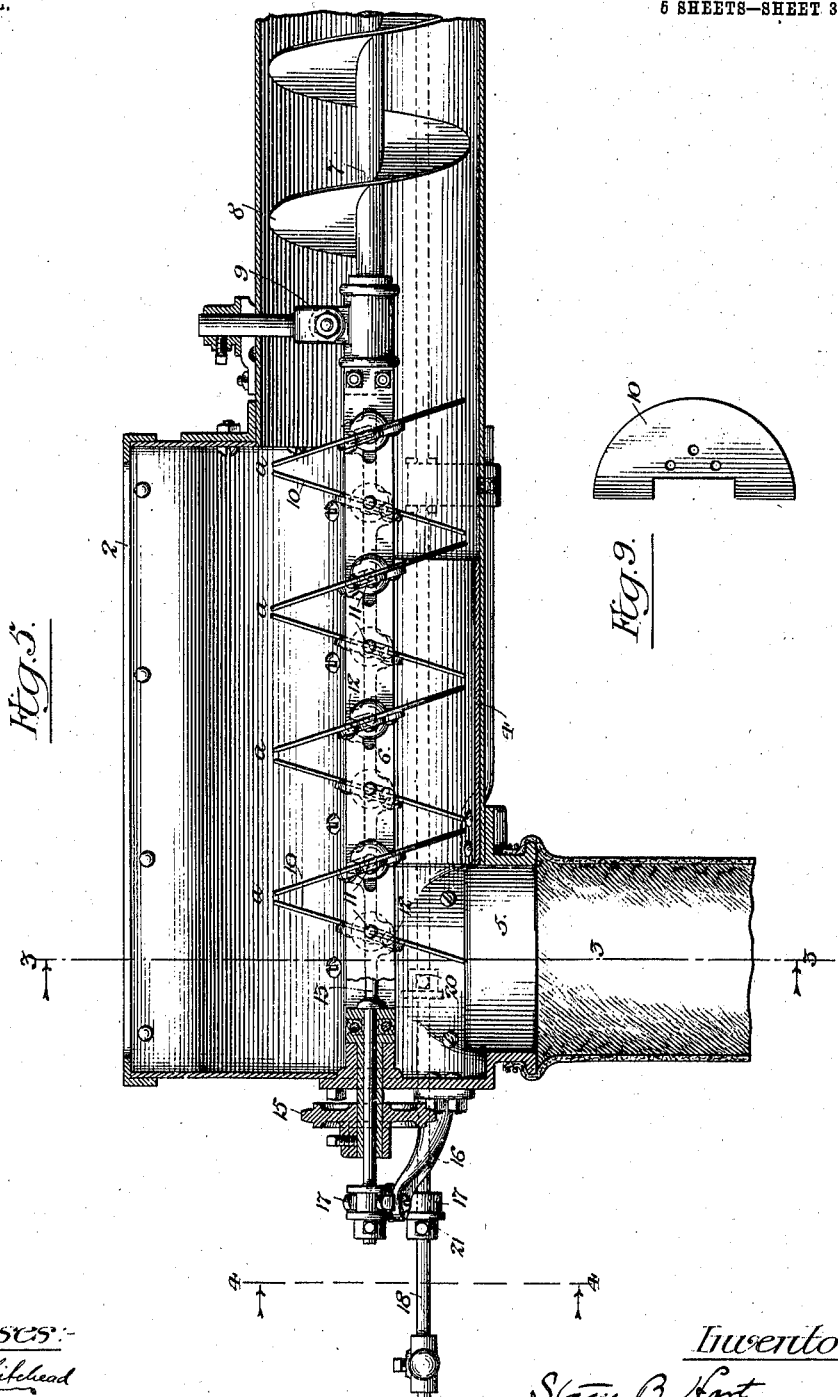

No. 728,460. PATENTED MAY 19, 1903.
S. B. HART.
CROSS CONVEYER FOR SEPARATORS, &c.
APPLICATION FILED JAN. 7, 1903.
NO MODEL. 5 SHEETS—SHEET 4.
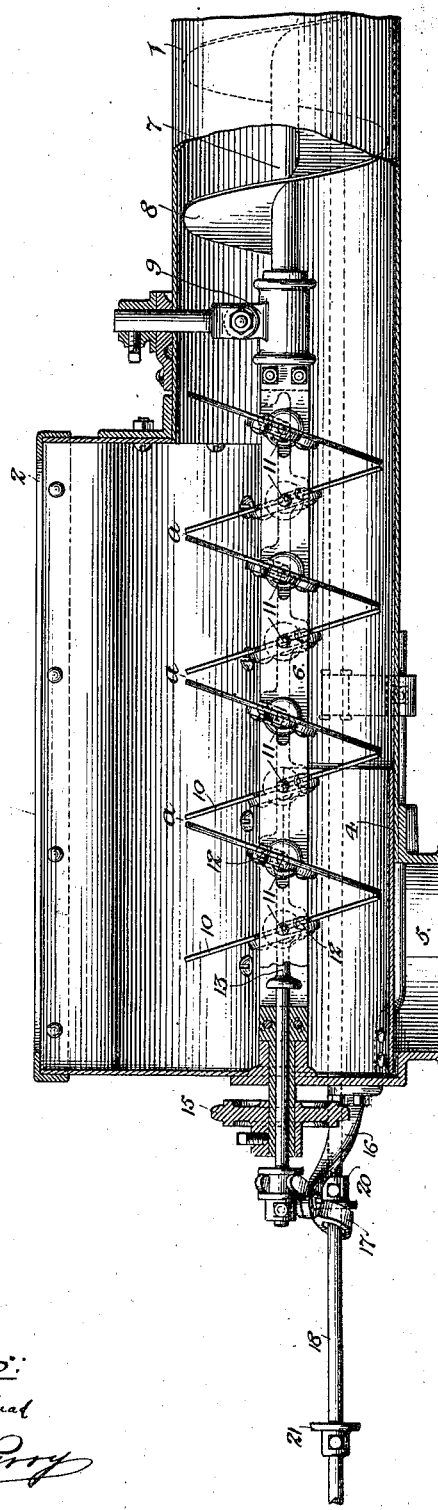
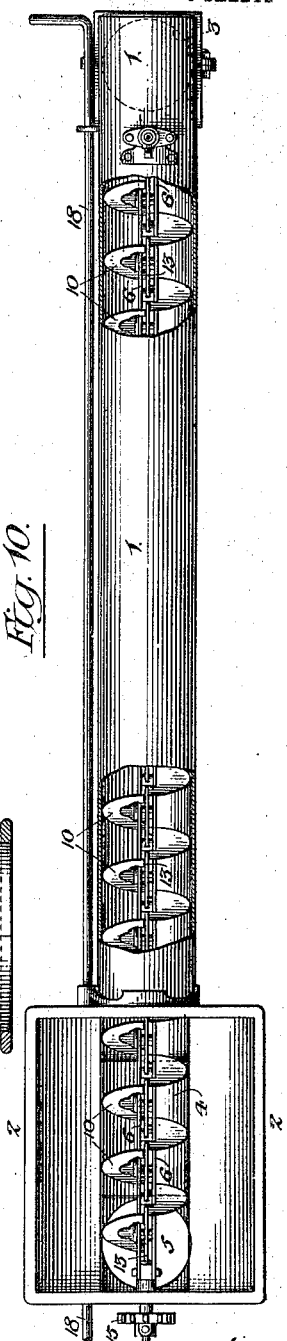
Witnesses:
Inventor:

No. 728,460. PATENTED MAY 19, 1903.
S. B. HART.
CROSS CONVEYER FOR SEPARATORS, &c.
APPLICATION FILED JAN. 7, 1903.
NO MODEL. 5 SHEETS—SHEET 5.
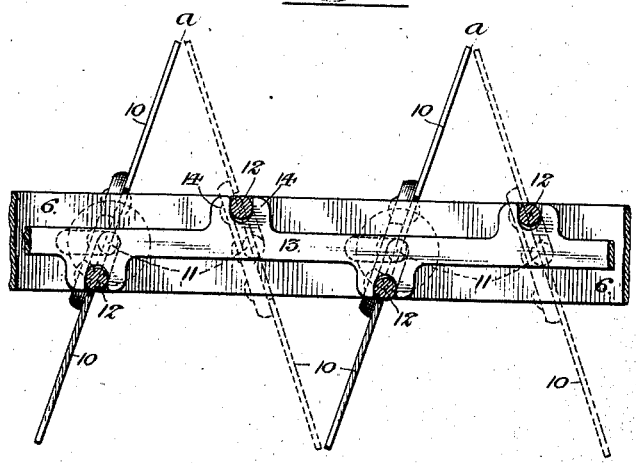
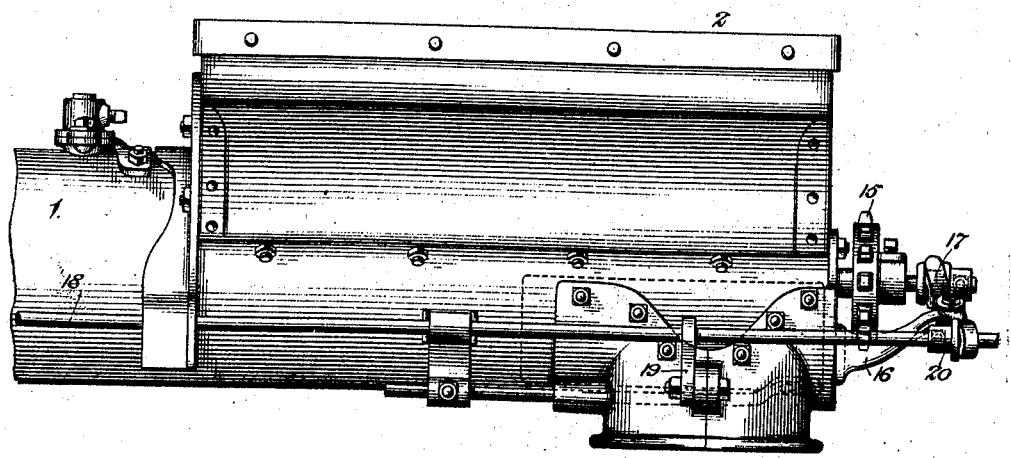

No. 728,460.                                   Patented May 19, 1903.

UNITED STATES PATENT OFFICE.

STACY B. HART, OF PEORIA, ILLINOIS, ASSIGNOR TO THE HART GRAIN WEIGHER COMPANY, OF PEORIA, ILLINOIS, A CORPORATION OF ILLINOIS.

CROSS-CONVEYER FOR SEPARATORS, &c.

SPECIFICATION forming part of Letters Patent No. 728,460, dated May 19, 1903.

Application filed January 7, 1903. Serial No. 138,116. (No model.)

*To all whom it may concern:*

Be it known that I, STACY B. HART, a citizen of the United States of America, residing at Peoria, county of Peoria, and State of Illinois, have invented certain new and useful Improvements in Cross-Conveyers for Separators and the Like, of which the following is a description.

My invention belongs generally to the class of conveyers and is shown as applied to that class of devices which are usually positioned upon the top of the machine and receive the grain delivered therefrom and by simple mechanism are arranged to deliver the grain to either side of the machine at will.

The object is to produce a simple, effective, and durable device for the purpose stated.

To this end my invention consists in the novel construction, arrangement, and combination of parts herein shown and described, and more particularly pointed out in the claims.

Figure 3:
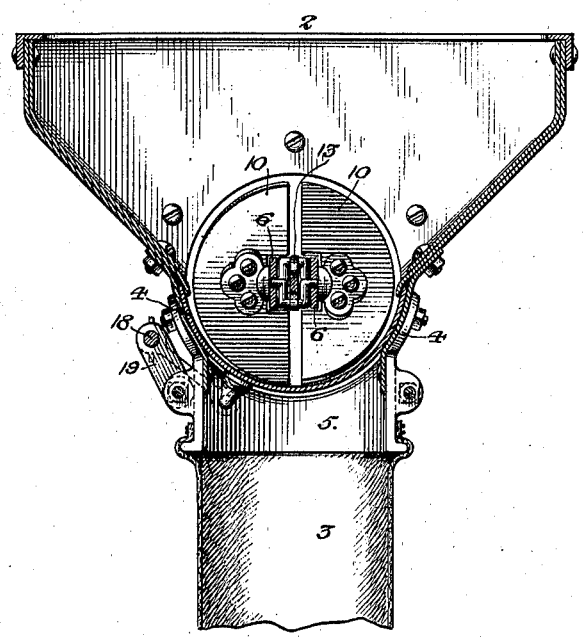
Figure 4:
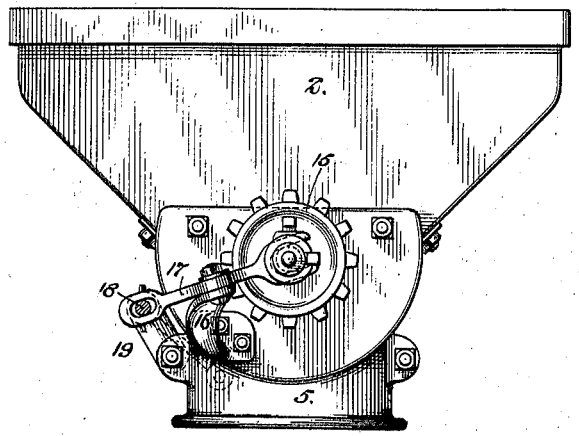

In the drawings, wherein like reference characters indicate like or corresponding parts, Figure 1 is a top plan of my improvement with parts broken away to show the construction. Fig. 2 is a side elevation. Fig. 3 is a vertical section of the same in line 3 3 of Fig. 5. Fig. 4 is a section in line 4 4 of Fig. 5. Fig. 5 is a partial central vertical section showing the adjustable wings adjusted to transport the grain in one direction. Fig. 6 is a similar view showing the wings adjusted to transport the grain in the reverse direction. Fig. 7 is a detail view of the reversing mechanism and reversible wings. Fig. 8 is a detail view of the shifting mechanism. Fig. 9 is a detail view of one of the reversible wings, and Fig. 10 is a view of a slightly-modified form of the device.

In the drawings, 1 represents a conveyer-tube adapted to be placed transversely upon the top of a separator or equivalent machine and provided with suitable means for receiving the grain from the machine. As shown in the drawings, a hopper 2 is provided for this purpose.

3 3 are suitable spouts at each end of the tube for conveying the grain therefrom. In the preferred form the hopper 2 is placed at or near one end of the device, which end is also provided with a valve 4, adapted to close the entrance 5 to spout 3.

As thus far described my improvement is of the usual form and construction, which is generally supplied with a centrally-supported shaft carrying a worm-conveyer and adapted to convey the grain in one direction. In my improvement means are provided to reverse the lead or inclination of the worm. This may be done in any preferred manner. As shown, two parallel bars 6 6 are arranged in lieu of said shaft and may extend the entire length of the tube, as shown in Fig. 10, or, as in the preferred form shown in the other figures of the drawings, extend only part way, the balance of the distance being completed with the usual shaft and worm-conveyer. In the preferred form, as stated, the usual shaft 7, provided with the worm-conveyer 8, extends from one end of the conveyer toward the other to a point near the hopper 2, as clearly shown in Figs. 1, 2, 5, 6.

9 is a bearing for the inner end of said shaft 7 and also for the proximate ends of the bars 6 6, as shown, the said bars and shaft being so connected as to rotate in unison.

10 10 are wings forming, substantially, the half of a circle, pivotally supported at their centers to the bars 6 6, as shown in Fig. 7. The wings are suitably spaced apart, so that when they are pivotally turned on their centers, as shown in Figs. 5, 6, and 7, their peripheries will come in close proximity to one another at the ends or sides a, so as to form a continuous worm as they are rotated, with the supporting-bars 6 6 forming a shaft for them. The several wings 10 are provided with projecting pins spaced from the pivoted center, which in the proximate wings extend on opposite sides of the center, as clearly shown in Fig. 7.

13 is a longitudinally-movable rod or bar provided with extending fingers 14, alternately extending in opposite directions to engage the extensions 12 of the several wings. It will thus be seen as the rod 13 is longitudinally moved the several wings will be rotated on their pivotal centers 11 to reverse the direction of their inclination, as clearly shown in Figs. 5, 6 and more particularly shown in Fig. 7. It will thus be seen that while the shaft 7 and the bars 6 6 are so secured and attached as to be rotated in unison, so that the worm 8 will continue to transfer the grain in one direction only, that portion of the device carried by the parallel bars 6 6 may be operated to adjust the inclination of the wings forming the worm, so that the grain will be transported in the general direction of the worm 8 and delivered thereto to be delivered to the opposite end of the device, or they may be reversed and the grain be transported in the opposite direction and delivered to the spout 3 near the hopper 2.

15 is a sprocket-wheel secured upon the end of the shaft or extensions 6 6 for rotating the shaft, the same being driven by any suitable connection with a driven part of the machine.

Any suitable means may be employed for operating the pivoted wings 10, as described. In the preferred form such means will be extended so that the operator may control the same from either side of the separator—that is to say, from either end of the conveyer. As shown in the drawings, this is readily accomplished in the following manner: 16 is an extending arm serving as a support for the lever 17, pivotally connected thereto, which lever has one end engaging the movable rod 13 and the other end extended to loosely engage the movable bar 18, which preferably extends the full length of the tube, as shown. The bar 18 is also connected with the valve 4, so that the initial movement of said bar will preferably first close or open the valve 4 before changing the inclination of the worm. In the preferred form the bar is connected with said valve, as at 19, Fig. 1, and has upon it two shoulders or sleeves 20 21, suitably arranged to permit the valve to be substantially closed or opened before the proper sleeve contacts with the lever 17. Thus, as shown in Fig. 1, the rod 18 may be moved to the left until the shoulder 20 contacts with the end of the lever 17, the distance or lost motion being sufficient to substantially close the valve 4 before reversing the worm, as before set forth. While in this position, the valve being closed, the wings are so inclined as to deliver the grain to the worm 8, which transfers it to the opposite end of the conveyer, delivering it upon the opposite side of the machine, the parts being in the position substantially as shown in Fig. 6. To reverse the device, the bar or rod 18 is longitudinally moved until the shoulder or stop 21 contacts with the lever 17, operating the same and longitudinally moving the rod or bar 13, and thus the wings, as before set forth. The initial movement, however, of the rod 18, as shown, serves to open the valve 4, so that there will be no obstruction to or interference with the delivery of the grain to the spout and a free discharge therefrom.

It is obvious that if desired the construction shown in Fig. 10 may be employed, in which the parallel bars 6 6 extend substantially the full length of the conveyer-tube, taking the place of the usual shaft, and the worm be entirely composed of the adjustable wings 10 10. However, this is an obvious equivalent, and the construction first described is preferred.

By the term "shaft" in the claims I wish to be understood as including the usual shaft or its equivalent for the purpose which, as shown, comprises the parallel bars or equivalent means. So, also, in the term "worm" I wish to be understood as meaning the usual continuous extending ribbon or worm or the equivalent wings for the same purpose.

It is obvious that after having thus described my improvement various immaterial modifications may be made without departing from the spirit of my invention. Hence I do not wish to be understood as limiting myself to the exact form and construction shown.

Having thus described my invention, what I claim as new, and desire to secure by Letters Patent, is—

1. A worm for conveyers comprising a rotatable shaft provided with a series of wings spirally extending around the shaft to form a worm, in combination with means for reversing the inclination or lead of said wings, at will.

2. A worm for conveyers, comprising a rotatable shaft having one section provided with the fixed worm thereon, and another section provided with reversible wings, in combination with means for reversing the lead of said wings, at will.

3. In a conveyer, a conveyer-tube, in combination with a worm-conveyer within the tube, means for driving the conveyer continuously in one direction, and means for reversing the inclination or lead of the worm thereof at will, whereby the material may be transferred in either direction.

4. In a device of the kind described, a conveyer-tube adapted to receive the material and provided with means at each end for discharging the same therefrom, in combination with a worm-conveyer arranged within the tube, means for driving the conveyer continuously in one direction, and means for reversing the inclination or lead of the worm thereof at will, whereby the material may be transferred in either direction in said tube and delivered at either end thereof.

5. In a device of the kind described, a conveyer-tube adapted to receive the material and provided with means at each end for discharging the same therefrom, in combination with a worm-conveyer arranged within the tube, means for driving the conveyer continuously in one direction, and means for reversing the inclination or lead of the worm on a section of said conveyer, at will, whereby the material delivered to said section may be transferred in either direction, substantially as described.

6. In a device of the kind described, a conveyer-tube provided with discharge-openings at each end, one of said openings being provided with a controlling-valve, and an inlet for the material located at the valve end of the tube, in combination with a worm-conveyer arranged within the tube, means for driving the conveyer continuously in one direction, and means for reversing the inclination or lead of the worm thereof at will, whereby the material may be transferred in either direction in said tube and delivered at either end thereof.

7. In a device of the kind described, a conveyer-tube provided with discharge-openings at each end, one of said openings being provided with a controlling-valve and an inlet for receiving the material located at the valve end of the tube, in combination with a worm-conveyer arranged within the tube, means for driving the conveyer continuously in one direction, and means for reversing the inclination or lead of the worm on a section of said conveyer in line with said inlet, at will, whereby the material delivered to said section may be transferred in either direction, substantially as described.

8. A worm for conveyers, comprising a rotatable shaft provided with a series of wings each comprising a substantially half-circle, and pivotally supported near the center to said shaft, in combination with a longitudinally-movable rod arranged to engage the adjacent wings on opposite sides of their pivotal support, whereby upon longitudinally moving said rod the inclination or lead of said wings will be reversed, substantially as described.

9. A worm for conveyers, comprising a rotatable shaft having one section provided with a fixed worm thereon, and another section provided with reversible wings, spaced from one another, each comprising substantially a half-circle, and pivotally supported on said shaft, in combination with a longitudinally-movable rod engaging the adjacent wings on opposite sides of their pivotal support, whereby upon longitudinally moving said rod the inclination or lead of the wings will be reversed.

10. In a device of the kind described, a conveyer-tube provided with discharge-openings at each end, one of said openings being provided with a controlling-valve, a longitudinally-movable rod connected to said valve whereby the same may be operated, and an inlet for material located at the valve end of the tube, in combination with a worm-conveyer arranged within the tube, means for driving the conveyer continuously in one direction, means for reversing the inclination or lead of the worm thereof at will, and intermediate mechanism whereby the longitudinal movement of the valve-rod will operate the reversing mechanism of the worm, substantially as described.

11. In a device of the kind described, a conveyer-tube provided with discharge-openings at each end, one of said openings being provided with a controlling-valve, a longitudinally-movable rod connected to said valve to operate the same, an inlet for material located at the valve end of the tube, in combination with a worm-conveyer arranged within the tube, means for driving the conveyer continuously in one direction, a longitudinally-movable rod arranged to reverse the inclination or lead of the worm on the conveyer, and intermediate mechanism connecting the valve-rod with said conveyer-rod, whereby the opening or closing of the valve will also reverse the inclination or lead of the worm, substantially as described.

12. In a device of the kind described, a conveyer-tube provided with discharge-openings at each end, one of said openings being provided with a controlling-valve, a longitudinally-movable rod connected to the said valve to operate the same and an inlet located near the valve end of the tube for receiving the material, in combination with a worm-conveyer arranged within the tube, and comprising a section provided with a worm rigidly fixed thereto, and a section near the valve end provided with reversible wings, means for driving the conveyer continuously in one direction, a longitudinally-movable rod arranged to reverse the inclination or lead of the adjustable connections and intermediate mechanism connecting the valve-rod with the conveyer-rod, whereby the opening or closing of the valve will simultaneously adjust the inclination or lead of the worm, substantially as described.

13. An adjustable worm for conveyers, comprising a shaft composed of parallel bars and a plurality of reversible wings pivotally secured to the bars and spaced from one another to form a continuous worm when adjusted, in combination with a longitudinally-movable adjusting-rod engaging adjacent wings on opposite sides of their pivotal supports.

14. A worm for conveyers, comprising a shaft having one section provided with a worm rigidly secured thereto, and a section composed of parallel bars, a plurality of reversible wings pivotally secured to the bars and spaced from each other to form a continuous worm when adjusted upon the bars, in combination with a longitudinally-movable rod engaging adjacent wings on opposite sides of their pivotal supports.

STACY B. HART.

Witnesses:
 ROY W. HILL,
 JOHN W. HILL.